Aug. 6, 1929.  J. M. RALSTON ET AL  1,723,707
AWNING FOR AUTO DOOR WINDOWS
Filed Aug. 19, 1926
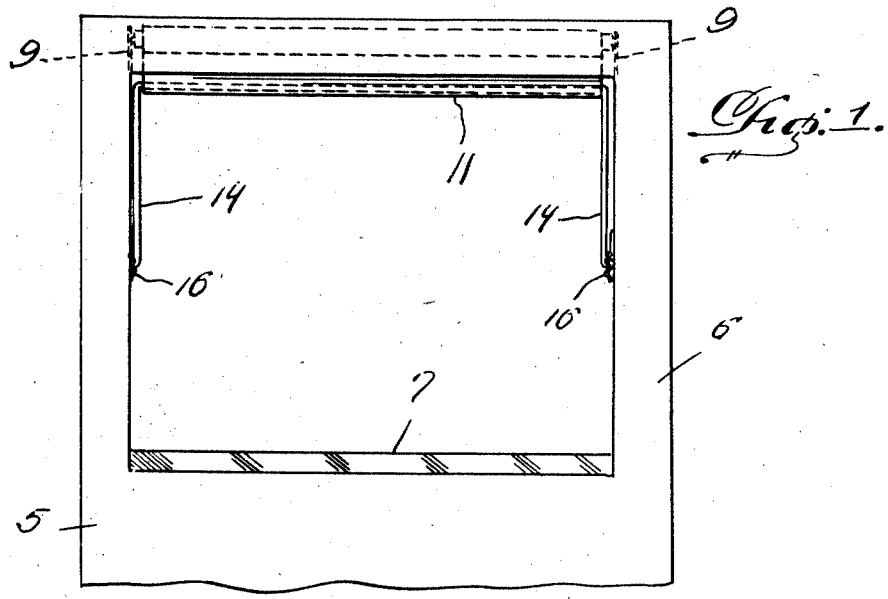
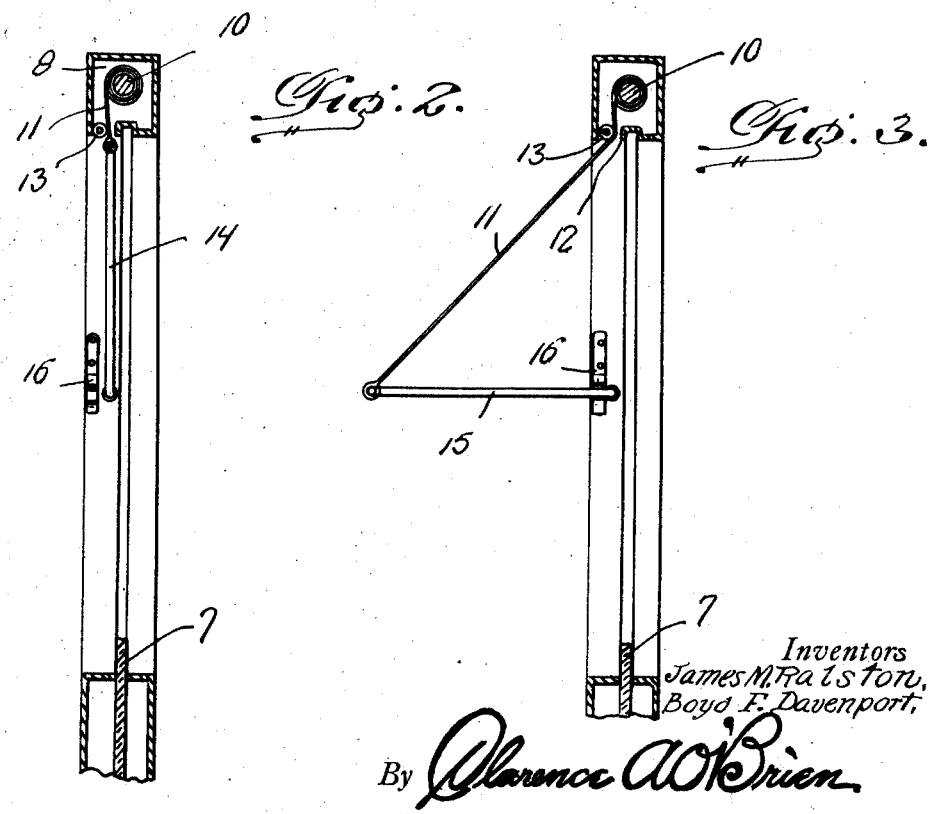
Inventors
James M. Ralston,
Boyd F. Davenport,
By Clarence A. O'Brien
Attorney Patented Aug. 6, 1929.

1,723,707

UNITED STATES PATENT OFFICE.

JAMES M. RALSTON AND BOYD F. DAVENPORT, OF RANGER, TEXAS.

AWNING FOR AUTO DOOR WINDOWS.

Application filed August 19, 1926. Serial No. 130,248.

This invention relates to awnings for the windows of closed automobile doors, and has for its primary object to substantially improve upon the type of invention shown and described in our co-pending application, Serial No. 109,292, filed May 15th, 1926. To the attainment of this end we have provided a door construction wherein the upper end thereof is formed with a boxing within which is mounted a spring controlled awning roller to which is secured one end of an awning strip and from which boxing the awning strip may be extended into shading position, means being provided for facilitating the withdrawal of the awning strip from the boxing and maintaining the same in proper relationship with the automobile door window.

The improved awning construction is of such a nature as not to detract from the appearance of the automobile regardless of whether or not the awning strip is in extended or retracted position. The main disadvantages of automobile door window awnings now in use is that the same include a great number of structural elements that are necessarily associated with the automobile door in such a manner as to considerably affect the appearance of the car.

In the drawing wherein like reference characters indicate corresponding parts throughout the several views:

Figure 1 is a fragmentary outer side elevation of a closed automobile door that is constructed and equipped in accordance with the present invention.

Figure 2 is a detail vertical section thereof, the awning being disclosed in fully retracted position, and Figure 3 is a similar view disclosing the awning in fully extended position.

Now having particular reference to the drawing, 5 designates a door of a closed automobile, the upper end of which is formed with a frame 6 within which is vertically slidable a glass pane 7, the door proper being constructed as is well known, to receive this glass pane when the same is lowered as clearly disclosed in Figure 2. In carrying out the present invention we construct the window frame 6 of the door with a horizontal boxing 8 at the upper end of the window frame, the inner side wall of this boxing being hinged or removable so as to permit access to the interior of the boxing. Arranged at opposite ends within the boxing 8 are vertically extending shade roller brackets 9—9 preferably of spring steel, the same being so formed at their upper ends as to receive the usual pintles upon the opposite ends of a spring controlled curtain roller 10 that is similar in all respects to the conventional curtain roller with the exception that no means is provided for preventing the rotation of the roller in a winding direction.

Secured at one end to the roller 10 is an awning strip 11, the free end of which is guided through a horizontal slot 12 in the bottom wall of the boxing 8 at the outer side of the glass pane 7, Figures 2 and 3. Arranged at the forward edge of this slot is a horizontal roller 13 to permit of the free movement of the awning strip into or out of the boxing.

Pivotally secured to the vertical posts of the window frame 6 substantially intermediate the ends thereof are the side arms 14—14 of a relatively U-shaped frame 15 to the horizontal portion of which is attached the free end of the awning strip 11. Disposed upon the inner sides of the vertical posts of the window frame 6 at the pivoted ends of the side arms 14 of said frame 15 are spring latch plates 16—16 over which the side arms of the frame 15 will pass when the same is swung downwardly into the horizontal position shown in Figure 3 for obviously maintaining the awning strip extended against the action of the spring roller.

It will thus be seen that we have provided a highly novel, simple and efficient form of awning construction for automobile door windows that will not detract from the appearance of the car regardless of whether or not the awning is extended or retracted, and also wherein the awning may be extended even though the window is entirely closed.

Having thus described the invention, what we claim as new and desire to secure by Letters Patent is:—

In combination, a vertically swinging arm pivoted at one end on a support, and a spring latch secured on the support to secure the vertically swinging arm in a horizontally disposed position, said spring latch comprising a latch plate constructed of spring metal and secured at its upper end, the lower free end portion of the plate being formed into a keeper for receiving the adjacent portion of the pivoted arm, and a nose portion formed directly above said keeper over which the pivoted arm is forcibly moved when raised or lowered out of or into engagement with the keeper respectively.

In testimony whereof we affix our signatures.

JAMES M. RALSTON.
BOYD F. DAVENPORT.